(12) United States Patent
Ihira et al.

(10) Patent No.: US 6,214,451 B1
(45) Date of Patent: Apr. 10, 2001

(54) FORMABLE ANTISTATIC RESIN MOLDED ARTICLE

(75) Inventors: Makoto Ihira, Himeji; Masato Sakai, Ibo-gun, both of (JP)

(73) Assignee: Takiron Co., Ltd., Osaka (JP)

( * ) Notice: Subject to any disclaimer, the term of this patent is extended or adjusted under 35 U.S.C. 154(b) by 0 days.

(21) Appl. No.: 09/117,947
(22) PCT Filed: Dec. 10, 1997
(86) PCT No.: PCT/JP97/04528
§ 371 Date: Aug. 10, 1998
§ 102(e) Date: Aug. 10, 1998

(30) Foreign Application Priority Data

Dec. 10, 1996 (JP) .................................................. 8-329437

(51) Int. Cl.$^7$ ...................................................... B32B 5/08
(52) U.S. Cl. ........................... 428/220; 428/904; 428/926; 428/922; 428/297.4; 428/299.1; 428/300.7
(58) Field of Search .................................. 428/922, 903, 428/299.1, 300.7, 220, 926

(56) References Cited

U.S. PATENT DOCUMENTS

| | | | |
|---|---|---|---|
| 4,540,624 | * | 9/1985 | Cannady, Jr. ........................ 428/408 |
| 4,579,902 | * | 4/1986 | O'Brien ................................ 524/496 |
| 5,571,859 | * | 11/1996 | Yukishige et al. .................... 524/496 |

FOREIGN PATENT DOCUMENTS

| | | |
|---|---|---|
| 2-125730 | 5/1990 | (JP) . |
| 3-274140 | 12/1991 | (JP) . |
| 6-21683 | 1/1994 | (JP) . |

OTHER PUBLICATIONS

Derwent Abstract No. 1988–122,078, "Anti–static chlorine–containing resin article", Mar. 23, 1988.*
Derwent Abstract No. 1989–161421, "Thermoplastic resin tier–sheet with antistatic properties", Feb. 14, 1996.*

* cited by examiner

*Primary Examiner*—Elizabeth M. Cole
(74) *Attorney, Agent, or Firm*—Wenderoth, Lind & Ponack, L.L.P.

(57) ABSTRACT

The invention relates to an antistatic resin molded article which comprises a thermoplastic resin substrate and an antistatic resin layer applied to the surface of the resin substrate. The antistatic resin layer is formed of a coating layer produced by dispersing conductive and extremely fine carbon long-fibers in the thermoplastic resin thereby holding the antistatic properties and enabling thermoforming. As the extremely fine carbon fiber, a pilled fiber aggregate composed of fibers with a fiber diameter of 3.5 to 500 nm and an aspect ratio of 100 to 3000 or an agglomerate in which the aggregates are agglomerated is used.

4 Claims, 1 Drawing Sheet

FORMABLE ANTISTATIC RESIN MOLDED ARTICLE

FIELD OF THE INVENTION

The present invention relates to an antistatic resin molded article which is provided with antistatic properties on the surface thereof without substantially increasing in surface resistance even in forming.

BACKGROUND OF THE INVENTION

Antistatic synthetic resin articles are used in their applications which dislike adhesion and deposition of dusts and other fine particles and hence provided with antistatic properties on the article surfaces in order to scatter electrostatic charge on the surfaces.

In order to impart antistatic properties to the synthetic resin molded articles, conventionally, conductive microparticles or fibers of stannic oxide, carbon, etc. are formulated and uniformly dispersed in the resin. The antistatic properties are produced by mutual contacts among the microparticles and/or fibers, thereby reducing the electric resistance of the molded articles.

Also, the applying of the antistatic property to only the surface of the molded article has been performed by including the conductive particles or fibers in only a surface layer of molded articles. For example, the molded articles have been produced by applying, to the surface of a resin substrate, a coating layer or film formed which includes the conductive particles or fibers and some synthetic resin, these molded articles being utilized as antistatic resin plates or the like.

In the conventional antistatic resin plates, a thermoplastic resin substrate is molded and the above antistatic film is then laminated on the substrate, and thereby the plates are obtained on which the surface exhibits high antistatic properties with the surface electric resistivity of $10^{11}$ Ω/□ or less.

However, as the resin plate formed in this manner is further heated and deformed in a manner that the surface area is extended, for example, by bending or vacuum forming, the surface resistance after the secondary forming is increased, posing the problem of a reduction in antistatic properties. The surface electric resistivity is generally increased by the extending deformation of antistatic resin plate. It is considered that this is caused by reduced frequencies of mutual contact among the microparticles or fibers or increased intervals between the particles due to extension of the resin in which the conductive particles or fibers are dispersed.

When the deformation in the forming step is so large as to produce plastic deformation, it is observed that the surface resistivity is increased since the conductive fibrous materials are oriented in the deforming direction to decrease the frequency of the mutual contact of the fibers and also the frequency of intervals of the fibers needed for the conductivity. This tendency will be clearly significant if the conductive materials are stiff and short fibers.

The molded article, which increases in surface resistivity with the antistatic properties decreased when the antistatic resin plate is formed such as a secondary processing after molded, must have limitations to its uses. In this case, the antistatic properties can be imparted by applying an antistatic paint to desired positions on the surface of the molded article after forming the molded article from the normal thermoplastic resin plate, whereas this requires any steps of applying the antistatic paint in which in the molded particles with complicated shapes, the formation of uniform coating layers having excellent surface qualities is difficult, no uniform antistatic properties being imparted.

In view of the above problems, the present invention has an object of providing an antistatic resin molded article having thermal-formability, which is not accompanied by a substantial increase in surface resistivity even by forming after imparting antistatic properties therein.

SUMMARY OF THE INVENTION

The antistatic resin molded article of the present invention comprises a thermoplastic resin substrate and an antistatic resin layer applied to any one of the surfaces of the resin substrate, wherein the antistatic resin layer is formed of a coating in which conductive elongated fibers are dispersed in a manner that they are flexuous in keeping contact with each another and/or such intervals between them as in conduction with each another. Even if this molded article is subjected to deformation due to reduction in area, tension or bending by subsequently thermoforming the article, the flexuous elongated fibers are intended only to be straightened but can never maintain neither mutual contact with each another nor conductible intervals between them, therefor ensuring the antistatic properties in the resin layer formed. Thus, the antistatic resin molded article can be obtained which possess both formability and antistatic properties, without losing the antistatic capability even in the secondary processing such as heat forming.

As such an conductive elongated fiber, a carbon fiber, metal fiber, and conductive organic fiber may be used, and preferably the thinnest and longest fibers are desirable since such fibers are easily entangled in contact with each another and also are readily flexuous. The most desirable fiber is a extremely fine carbon long-fiber.

The extremely fine carbon long-fibers has a property of being naturally entangled with each another to gather into a woolen-pill form and a great number of fibers are allowed to projected out of said pill-shaped aggregate, and by dispersing a great number of aggregates of such a structure uniformly in a thermoplastic resin, the fiber aggregates in the resin layer are brought into contact with each another and/or are allowed to hold such intervals between them in conduction, imparting the antistatic properties to the resin layer.

Conventional carbon fibers are large in fiber diameter having stiffness, which are hard to be not entangled with each another, whereas the long-fibers, especially, the extremely fine carbon long-fibers used in the present invention are extremely fine, specifically, with a large ratio of the length to the fiber diameter so that the carbon fibers can be dispersed in a manner that these are entangled with each another. Extremely fine carbon fibers which are entangled pill form are also easily dispersed with the pilled form and the pilled aggregates are easily entangled with each another. In order to form pilled aggregate of the carbon fibers, preferably the carbon fibers are so extremely fine as to be 3.5 to 500 nm in fiber diameter and 100 to 3,000 in aspect ratio (a ratio of the length relative to the fiber diameter). Such pilled carbon fiber aggregates make a condition of projecting many carbon fibers and under the condition that the pilled aggregates are close to each another, the carbon fibers projecting and extending radially from the pilled aggregates are in contact with each another in the resin layer or maintain conductible intervals among them to form the electric conductive condition.

In the present invention, a coating layer of an resin solution to which an conductive long-fiber is added is applied on the surface of a substrate to allow even a small amount of the conductive long-fiber to maintain the widespread dispersion condition in the resin layer. Even if the resin article on which the coating layer has been applied is deformed in heating as a secondary processing, the entangled conductive long-fibers in the resin layer are hardly disentangled whereby its conductive condition can be held and a reduction on the antistatic properties is hence made small. In the coating layer to which an extremely fine long-fiber is added, far from being reduced in antistatic properties by forming, appropriate compressing the coating layer by appropriately forming ensures that the probability of contacting and approaching electrocoductively the mutual pilled aggregates or many mutual carbon fibers projecting from the aggregates rather increase, result in exhibiting increased antistatic properties.

PREFERRED EMBODIMENT OF THE INVENTION

Figure 1A:
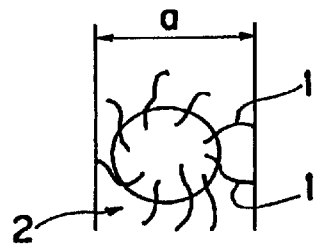
FIG. 1A is a schematic views showing a pilled aggregate of a graphite fiber used in the present invention and FIG. 1B a schematic views showing the assembled condition of the pilled aggregate respectively.

The antistatic resin molded article used for molding according to the present invention comprises a thermoplastic resin substrate and an antistatic resin layer, wherein the compound of the thermoplastic resin substrate is selected to be suitable for application of the molded article, examples of which include olefin-based resins such as polyethylene and polypropylene, vinyl-based resins such as polyvinyl chloride and polymethylmethacrylate, and ester-type resins such as polycarbonate, polyethylene terephthalate, unsaturated polyester and aromatic polyester. Among these, polyvinyl chloride may be preferably used, having excellent resistance to chemicals, resistance to heating temperature of 70 to 80° C., and high strength.

The configuration of the substrate include a plate, sheet, film, tube, or, other than these, a wire, string, and rod. Although the configuration of the substrate is not limited if adequate to its usage and easy formation of the antistatic resin layer, preferably it is selected from those suitable for the subsequent thermoforming. Particularly, a plate or a sheet is desirably adopted since it can be utilized in thermoforming.

The antistatic resin layer is a coating layer which is produced by dispersing, in a thermoplastic resin, pilled fiber aggregates of an conductive long-fiber, preferably an conductive carbon long-fiber and which serves to impart antistatic properties to the surface of the molded article. The resin layer is formed from a thermoplastic resin, allowing the resin layer to be formed in the subsequent secondary processing.

The resin used for this resin layer is selected from the same or different kind of the above thermoplastic resins for constituting the above substrate. Because this resin layer is formed of the coated film, in particular, the resin forming the coating layer is preferably the same type as those which are used for the substrate and can be made into a solution to disperse an conductive long-fiber with ease in view of its adhesion to the substrate. The different kind of resins may also be used, and especially in the case where it is difficult to make the coating fluid from the resin of the same kind or the same kind of the resins are inferior in weatherability, surface hardness, or wear resistance, the resin is selected from the different kind of resins which can be made into an coating fluid, have higher weatherability, surface hardness and wear resistance than those of the same as the substrate resin, and possess strength of adhesion to the substrate resin after the applied solution is cured.

For the coating fluid for the antistatic resin layer, when the resin substrate is of polyvinyl chloride, the solution may be used by dissolving polyvinyl chloride, its copolymer or an acrylic resin in a highly compatible and volatile solvent such as methyl isobutyl ketone, methyl ethyl ketone, or cyclohexanone. In the case of the resin substrate made of polycarbonate, the above coating fluid containing polyvinyl chloride, its copolymer, or an acrylic resin may also be used and in the case of the resin substrate of an acrylic resin, the above coating fluid containing an acrylic resin may be used.

This resin layer is applied as a coating layer on the surface of the substrate, for example, on any one or both surfaces of the substrate. The method for applying the coating layer includes a method of directly applying on the surface of the substrate using gravure rolling or the like or a dipping method. There is also a method in which a coating layer containing an conductive long-fiber is formed on a thermoplastic resin film and the backface of the film is applied to the above substrate. In this case, the application is made using a method in which the backface of the film is bonded to the surface of the substrate either via an adhesive or by thermocompression using a heat press or a roll press.

As the conductive long-fiber used in the present invention, a carbon fiber, metal fiber such as stainless steel or copper, or organic fiber containing copper sulfide or the like may be used. These fibers are flexuous with any part thereof being in contact with each another and/or maintaining conductible intervals between them to render the fibers conductible. The diameter of each fiber is preferably 50 $\mu$m or less to allow the fibers to twine so that these are in contact with each another or close to each another thereby enabling the fibers to be in conduction.

As the conductive long-fiber, a carbon long-fiber with a length sufficient as compared with the fiber diameter is desirable and an extremely fine fiber is preferably used. Such a carbon long-fiber includes both indefinite carbon fiber and graphite fiber and furthermore, as the carbon long-fiber, a carbon fiber in which an indefinite carbon and a graphite coexist in an elemental fiber is also used. It is desirable that every one of these carbon fibers is extremely fine and is of such a nature that the fibers are twisted and entangled to form aggregates.

The most preferable conductive carbon long-fibers are those having a graphite-based fiber structure in which the fiber is elongated extremely with section circle, is laminated with the graphite layers coaxially to the axis of the fiber and the fiber diameter is 1 $\mu$m or less.

The method of producing such a graphite fiber is described in Japanese Patent Publication JP-B 3-64606. The graphite fiber disclosed in this publication is an extremely fine fiber formed of graphite layers which are precipitated and laminated on the same axis as the fiber axis by the catalytic reaction of an iron family metal or its oxide in a mixed gas flow consisting of an aromatic or non-aromatic hydrocarbon and hydrogen. Preferably this fiber has a structure in which the C axis of the lamellar crystal of graphite is perpendicular to the fiber axis and is reduced in deposition of amorphous carbon.

In particular, the extremely fine carbon long-fiber has a shape with a fiber diameter (the diameter of a single fiber) of 1 μm or less and preferably from 3.5 to 500 nm.

An extremely fine carbon long-fiber with a smaller fiber diameter is desirable since it can be aggregated with ease. However if the fiber diameter is less than 3.5 nm, the fiber is easily cut in the molding step, while the fiber having the diameter exceeds 500 nm tends to be stiff, which is disadvantaged in its aggregation.

The extremely fine carbon long-fiber is allowed to have an aspect ratio (ratio of length relative to fiber diameter) of 5 or more to make twine and entanglement of the fibers ease; consequently, formation of the aggregates of the fiber is made easy, particularly the aspect ratio of 100 to 3,000 is desirable, whereas the aspect ratio of less than 100 make difficult to form the aggregates so that the frequency of mutual contact among the fibers decreases or conductible intervals cannot be maintained, the closed short formed by contact among the aggregates in the coating layer being released in the subsequent thermoforming of the molded article whereby the antistatic properties are probable to decrease. On the other hand, if the aspect ratio exceeds 3000, the aggregate of carbon fiber is made too large and the frequency of contact between the aggregates or maintenance of conductible intervals is thereby reduced for the formulation of the fiber.

Figure 1B:
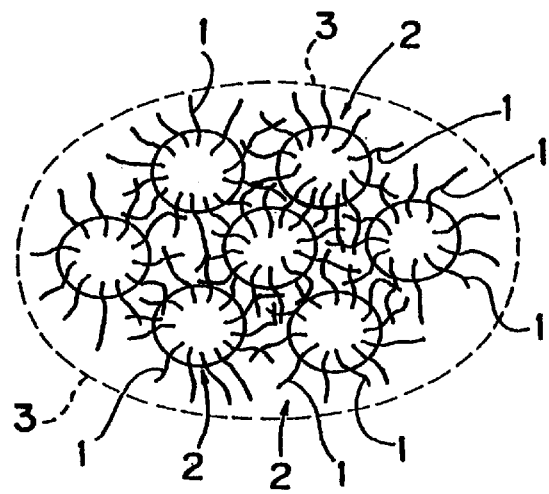

As shown in FIG. 1A, since the extremely fine carbon long-fiber 1 has a small fiber diameter and a large aspect ratio, the fibers 1, 1 are entangled with each another and the microscopic appearance shows that the fibers are aggregated in a pilled form, that the pilled fiber aggregate 2 has a size with a diameter a of about 0.2 to 10 μm and that the flexuous fiber 1 radially spreads from the periphery of the pill. A great many pilled fiber aggregates 2, as shown in FIG. 1B, are gathered in contact with each another or maintain conductible intervals among them while these are overlapped and agglomerated with each another, to form an secondary agglomerate 3.

When such an agglomerated and pilled aggregate 2 is added to an coating fluid, the liquid resin penetrates into the pills and the secondary agglomeration among the pills are released whereby the pills are dispersed and uniformly distributed. As this resulting coating fluid is applied to the resin surface and the solvent in the solution is vaporized whereupon, parts of fibers of the pills are projected and scattered around even in the cured resin layer and the surrounding of the pills adjacent to each another behave such that the fibers of the adjacent pills cross in contact with each another or close to each another, whereby conductivity among the pilled carbon fiber aggregates 2 is held to reduce in electric resistance of the resin layer.

In the formation of the antistatic resin layer, a thermoplastic resin is dissolved in a volatile solvent to make a solution, in which the aforementioned carbon long-fiber is dispersed to produce the coating fluid. The coating fluid is applied to the aforementioned substrate and the solvent is removed by vaporization to cure the solution thereby forming a coating layer.

The application to the surface of the substrate can be performed by utilizing knife edge coating, roll coating, spray coating or the like. When the substrate is a flat plate, a gravure printing method using roll coating is preferable because the applied thickness is uniformly controlled.

In the present invention, the reason why the antistatic resin layer is formed of the coating layer is that the antistatic layer can be formed on the surface of the substrate under the dispersion condition of the aggregates of the carbon long-fiber being maintained.

An amount of the carbon long-fiber in the antistatic resin layer is desirably within 1% and 8% by weight. In the loading of less than 1% by weight, no antistatic properties can be obtained while the amount exceeds 8% by weight, the surface resistivity is not so much reduced as the amount increases. Particularly the preferable amount is within 3 and 8% by weight. It is desirable that the solvent is added to the coating fluid so that the amount of the carbon long-fiber is from 0.2 to 0.8% by weight whereby the coating fluid can be uniformly applied. If the formulation falls in this range, the coating fluid has an appropriate viscosity which enables uniform application.

The thickness of the antistatic resin layer formed of a coating layer from 0.1 to 10 μm after the coating fluid is dried to remove a solvent by vaporization and thereby to cure the coating fluid. The molded article has a surface resistivity of about $10^4$ to $10^{11}$ Ω/□ which can be achieved with ease. When the thickness is less than 0.1 μm, significantly low surface resistivity cannot be obtained. Also, when the molded article is extended by secondary processing, the thickness of the coating layer is more reduced, which makes it impossible to keep a desired antistatic properties. If the thickness is more than 10 μm, the surface resistivity is almost the same as in the case where the thickness is 10 μm, this indicating that a thickness more than 10 μm is no significant. Furthermore, an increased thickness causes the transparency to be impaired. In view of this, also, the thickness is preferably less than 10 μm. When a transparent resin is used as the substrate, the fiber is extremely fine and only an amount of 1 to 8% weight is sufficient despite the use of a black carbon long-fiber as the antistatic resin layer. Therefore, a molded article having a transparency with a transmission factor of about 30 to 90% can be obtained depending on the qualities and thickness of the substrate.

The molded article provided with the antistatic resin layer formed on the surface thereof in the above manner can be subjected to secondary processing according to the application since both the materials for the substrate and the resin layer are thermoplastic resins. The secondary processing include bending made by heating the molded article, pressing, vacuum forming, pressure air forming, blowing, and extrusion. Though these secondary processing causes expanding deformation and reduction in thickness and area expansion involved by these phenomena, unless the work is extreme, the surface resistivity does not almost increase but rather tends to decrease, the molded article showing sufficient antistatic properties even after the secondary processing.

Figure 2:
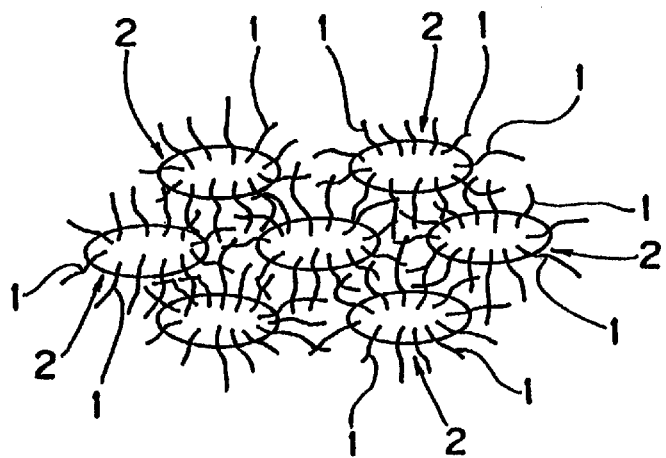
FIG. 2 is a schematic view showing a condition of pilled aggregate of a graphite fiber dispersed in an antistatic resin layer.

The surface resistivity dose not substantially increases in this manner because of the following reasons. Specifically, since in the pilled aggregates of the fibers which are dispersed in the antistatic resin layer and are in contact with each another or maintain conductible intervals among them, each fiber is snarled and entangled with others, and even if the antistatic resin layer is deformed by thermoforming and each aggregate is separated, the entangled fibers intended only to extend straight while these fibers maintain the contact condition or conductible intervals showing that the conductivity is held without any change. However, if the flexuous fibers are extended more greatly than its extension limits due to excessively large deformation, the fibers are cut and the conductible intervals cannot be held. So the deformation, that is, the forming magnification must be up to 10.0. In case of a resin layer in which the pilled aggregates are dispersed, the surface resistivity tends to decrease when the forming magnification is from 2 to 5. It is considered that this is because, as shown in FIG. 2, as the antistatic resin layer is compressed in a vertical direction in the thermoforming step, each aggregate which are distributed in the vertical direction in the resin layer and are held in no conduction approaches to another to be brought into contact with another or allowed to hold conductible intervals, and then the conduction among the fibers is held, leading to an increase in mutual conduction points; thus, the thermoforming reduces the surface resistivity.

The antistatic resin molded article with transparency which use a transparent resin as the substrate can also retains antistatic properties in the same manner as above even if it is treated by secondary processing so that the molded article possessing all antistatic properties, secondary formability and transparency can be produced accordingly. Further in the present invention, colorants can be added to the transparent resin to make a substrate with desired colors in advance, and then the molded article can be obtained which combines a deep color tone without damaging an intended color with antistatic properties and secondary formability, and high transparency in the antistatic resin layer.

EXAMPLES

A powder of polyvinyl chloride as the thermoplastic resin was added to cyclohexanone as the solvent and dissolved. A graphite based fiber (trademark: Graphite Fibrils, average fiber diameter of 10 nm, average length of 10 $\mu$m, manufactured by High Pillion Catalysis International Ltd.) was added to the solution at various concentrations to prepare for coating fluids.

Using a polyvinyl chloride sheet with a thickness of 2.0 mm as the resin substrate, each of the above coating fluids was applied to the surface of this sheet using a bar coater so that the dried coating layer had two levels of thickness of about 2 $\mu$m and 4 $\mu$m, followed by drying to cure the solution thereby forming an antistatic coating layer. The sheet was heated to 200° C. to carry out vacuum formation. The forming magnification (the ratio of the areas of the substrate before and after the vacuum forming) in the vacuum forming step was designed to be from 2 to 10 to compare the ratio of the surface resistivities before and after the vacuum forming.

With regard to samples (Examples 1 and 2) in which the contents of the graphite fiber were 4.5% by weight and 3.6% by weight respectively, the results of measurement of the surface resistivity before and after the vacuum forming are collected in Table 1.

For Comparative Example 1, an antistatic polyvinyl chloride sheet was formed using an antistatic paint containing microparticles of stannic oxide $SnO_2$. In this Comparative Example 1, 9% by weight of the aforementioned polyvinyl chloride and 15% by weight of $SnO_2$ (trademark: ELCOM TL35, a grain size of 200 nm or less, manufactured by Catalysts & Chemicals Industries Co., Ltd.) were added to cyclohexanone to prepare an coating fluid. The coating fluid was applied to the same polyvinyl chloride sheet as used in Examples to form a coating layer. The surface resistivity of the resulting samples was measured before and after the vacuum forming and compared in the same manner as in Examples.

For Comparative Example 2, an antistatic paint (trademark: Neokon Coat S2120, manufactured by Dainichiseika Colour & Chemicals Mfg. Co., Ltd.) which containes needle-shaped conductive titanium oxide was applied to a polyvinyl chloride sheet in the same manner as in Examples and the surface resistivities measured before and after the vacuum forming were compared.

TABLE 1

| Sample | Layer thickness ($\mu$m) | Surface resistivity ($\Omega/\square$) Forming magnification (times) | | | |
|---|---|---|---|---|---|
| | | 1 | 2 | 3 | 5 |
| Example 1 | 2.3 | 2-8 × $10^8$ | <1 × $10^6$ | 1-2 × $10^5$ | 4-7 × $10^6$ |
| | 4.1 | 1 × $10^7$ | <1 × $10^6$ | <1 × $10^6$ | <1 × $10^6$ |
| Example 2 | 2.3 | 1-2 × $10^9$ | 2-3 × $10^6$ | 1-7 × $10^5$ | 3-5 × $10^7$ |
| | 4.2 | 3-7 × $10^7$ | <1 × $10^6$ | <1 × $10^6$ | <1 × $10^6$ |
| Comparative Example 1 | 2.1 | 1-3 × $10^6$ | >1 × $10^{12}$ | >1 × $10^{12}$ | >1 × $10^{12}$ |
| | 4.2 | 1 × $10^6$ | >1 × $10^{12}$ | >1 × $10^{12}$ | >1 × $10^{12}$ |
| Comparative Example 2 | 2.6 | 2-8 × $10^7$ | >1 × $10^{12}$ | >1 × $10^{12}$ | >1 × $10^{12}$ |
| | 4.0 | 1-2 × $10^6$ | 2 × $10^8$ | >1 × $10^{12}$ | >1 × $10^{12}$ |

Note) A forming magnification of 1 indicates the sheet before vacuum formed.

As shown in Table 1, in the measurement after the formation of the coating layer and before vacuum forming (a forming magnification: 1), the molded articles of Examples containing the graphite fiber have surface resistivities of about $10^7$ to $10^9$ $\Omega/\square$, exhibiting sufficient antistatic properties. On the other hand, the molded articles of Comparative Example 1 containing microparticle $SnO_2$ has the surface resistivities of about $10^6$ $\Omega/\square$, which are lower than those of Examples, showing that these molded articles have more sufficient antistatic properties. The molded article of Comparative Example 2 containing needle-shaped titanium oxide has surface resistivities of about $10^6$ to $10^7$ $\Omega/\square$, showing that this molded article has a sufficient antistatic properties. In addition, both Examples and Comparative Examples are reduced in surface resistivity with an increase in layer thickness.

After these samples were vacuum formed, the surface resistivity of the articles in Comparative Examples 1 and 2 increased to $10^{12}$ $\Omega/\square$ or more, exhibiting no antistatic properties as the forming magnification was 3.0 or more. On the contrary, the phenomenon was observed in which the surface resistivity of Examples using the graphite fiber according to the present invention more is decreased than before the molding even when the forming magnification was 5.0. Specifically, the surface resistivity was $10^7$ $\Omega/\square$ or less. It can be found that such results are made because of the following; specifically, since, in the vacuum forming step, the coating layer is extended and made thin along with an extension of the molded article or since the molded article is brought into contact with the mold whereby the coating layer is pressed, in Examples the flexuous fibers are merely extended but the contact among the fibers or conductible intervals can be held. In addition, the aggregates of graphite fibers dispersed in the coating layer are deformed flat and long without changing their positions. The aggregates which are distributed vertically and are not contact with each another, are newly brought into contact with each another or close to each another within the conductible intervals, increasing the frequency of the contact and conductible approach.

On the other hand, in Comparative Example 1 using $SnO_2$ microparticles, it is considered that the mutual contact and approach of $SnO_2$ microparticles were lost as the coating layer is extended, resulting in an increase in the surface resistivity. In Comparative Example 2 using acicular conductive titanium oxide, it is thought that the mutual distance between the conductive titanium oxides is spread when the coating layer is extended and the contact between the conductive titanium oxides and the approach of conductive titanium oxides to each another which is required for conduction disappear and, at the same time, the acicular titanium oxides are oriented in the direction of the deformation and then the contact among the vertically oriented titanium oxides and the approach of vertically oriented titanium oxides to each another disappear. Other than the above, because in Comparative Example 2 they are acicular, these particles will hold the mutual contact among them and approach to each another more frequently than the spherical micro-particles of Comparative Example 1 (When the forming magnification is 2, the surface resistivity is $2\times10^8$ $\Omega/\square$, which is not however practical since the forming magnification is 2 at most).

Table 2 shows the results of measurement with respect to the relation between the addition of fibers in a coating layer and the surface resistivity before and after vacuum forming using each of antistatic polyvinyl chloride sheets manufactured using the aforementioned graphite fiber (Graphite Fibrils) with varied formulations for the coating layer. Table 2 shows that in the addition of 0.93% by weight, antistatic properties are not observed. In the addition of 1.3% by weight, slight antistatic properties are observed, indicating that the lower limit of the amount is 1% by weight. If the addition is 8.6% by weight, almost the same surface resistivity as in the case where the formulation is 7% by weight is exhibited, showing that the formulation exceeding 7% by weight is nonsense. From these results, if the formulation of a carbon-long fiber (Graphite Fibrils) is in a range from 1 to 8% by weight, an appropriate antistatic properties can be obtained.

TABLE 2

| Amount (wt % in solid) | Layer thickness ($\mu$m) | Surface resistivity ($\Omega/\square$) Forming magnification (times) | | |
|---|---|---|---|---|
| | | 1 | 3 | 5 |
| 0.93 | 4.3 | $>1 \times 10^{12}$ | $>1 \times 10^{12}$ | $>1 \times 10^{12}$ |
| 1.3 | 4.2 | $2 - 8 \times 10^9$ | $5 - 9 \times 10^{11}$ | $>1 \times 10^{12}$ |
| 3.6 | 4.2 | $3 - 7 \times 10^7$ | $<1 \times 10^6$ | $<1 \times 10^6$ |
| 4.5 | 4.1 | $1 \times 10^7$ | $<1 \times 10^6$ | $<1 \times 10^6$ |
| 7.0 | 4.0 | $1 - 2 \times 10^6$ | $<1 \times 10^6$ | $<1 \times 10^6$ |
| 8.6 | 4.0 | $<1 \times 10^6$ | $<1 \times 10^6$ | $<1 \times 10^6$ |

Next, using a polyvinyl chloride sheet provided with a resin layer containing "Graphite Fibrils" in a formulation of 4.5 parts by weight in a coating layer and having a coating thickness of 4.1 $\mu$m, the relation between the forming magnification by vacuum forming and the surface resistivity was calculated. The results are shown in Table 3. It is clear from Table 3 that when the forming magnification is 7, the surface resistivity slightly increases and when the forming magnification is 10, the surface resistivity increases to $10^{12}$ $\Omega/\square$ or more, exhibiting no antistatic properties. It is considered that even if the fibers are meandered, such a fabrication by a forming magnification of as high as 7 causes the fibers to extend and thereby to follow the deformation of the resin with slight difficulty whereby some fibers (aggregates) can be in no contact with each another or approach to each another to hold in conduction. From these facts and as is evidenced in Table 4 illustrated hereinbelow, it is thought that a forming magnification of up to 10 allows the antistatic properties to be held taking practical working forming magnification into consideration with the fact that the potential of the forming magnification ensuring antistatic properties increases along with increased thickness. It is also clear from Table 3 that when the forming magnification is up to 5, the surface resistivity is decreased by secondary processing and desirable forming magnification is up to 7.

TABLE 3

| Forming magnification (times) | Surface resistivity ($\Omega/\square$) |
|---|---|
| 1 | $1 \times 10^7$ |
| 2 | $<1 \times 10^6$ |
| 3 | $<1 \times 10^6$ |
| 5 | $<1 \times 10^6$ |
| 7 | $1 \times 10^8$ |
| 9 | $1 \times 10^{10}$ |
| 10 | $>1 \times 10^{12}$ |
| Amount (in solid) | 4.5 wt % |
| Layer thickness | 4.1 m |

Next, the addition of "Graphite Fibrils" in the coating layer was fixed to 4.5 parts by weight and the thickness of the coating layer was varied to investigate the effect of the layer thickness on the surface resistivity. The results are shown in Table 4. Table 4 shows that the surface resistivity decreases along with an increase in the thickness and this tendency is valid as the forming magnification is large. However, even when the layer thickness is 15 $\mu$m, the surface resistivity does not differ from that in the case where the layer thickness of 8 $\mu$m indicating that a layer thickness of about 10 $\mu$m is sufficient. When the thickness is as thin as 0.3 $\mu$m, the surface resistivity is increased to $10^{12}$ $\Omega/\square$ or more, exhibiting insufficient antistatic properties. However, when forming is performed at a forming magnification of 3, the surface resistivity is reduced to $10^{10}$ $\Omega/\square$, exhibiting sufficient antistatic properties. The layer thickness is preferably 0.1 to 10 $\mu$m and more preferably 1 to 8 $\mu$m taking the above fact into consideration with the fact that the surface resistivity tends to decrease when the formulation of fibers is increased.

TABLE 4

| Amount (wt % in solid) | Layer thickness ($\mu$m) | Surface resistivity ($\Omega/\square$) Forming magnification (times) | | | | |
|---|---|---|---|---|---|---|
| | | 1 | 3 | 5 | 7 | 10 |
| 4.5 | 0.30 | $>1 \times 10^{12}$ | $3-8 \times 10^{10}$ | $>1 \times 10^{12}$ | $>1 \times 10^{12}$ | $>1 \times 10^{12}$ |
| | 0.50 | $>1 \times 10^{12}$ | $1 \times 10^9$ | $>1 \times 10^{12}$ | $>1 \times 10^{12}$ | $>1 \times 10^{12}$ |
| | 1.0 | $5-7 \times 10^9$ | $1-4 \times 10^7$ | $1 \times 10^{10}$ | $>1 \times 10^{12}$ | $>1 \times 10^{12}$ |
| | 2.3 | $2-8 \times 10^8$ | $1-2 \times 10^6$ | $4-7 \times 10^6$ | $1-5 \times 10^7$ | $>1 \times 10^{12}$ |
| | 4.1 | $1 \times 10^7$ | $<1 \times 10^6$ | $<1 \times 10^6$ | $1 \times 10^8$ | $>1 \times 10^{12}$ |
| | 8.0 | $<1 \times 10^6$ | $<1 \times 10^6$ | $<1 \times 10^6$ | $<1 \times 10^6$ | $1 \times 10^7$ |
| | 15.0 | $<1 \times 10^6$ | $<1 \times 10^6$ | $<1 \times 10^6$ | $<1 \times 10^6$ | $<1 \times 10^6$ |

Furthermore, the relation between the layer thickness and the transparency was investigated, the results being shown in Table 5. Table 5 shows that though the transparency decreases with an increase in the layer thickness, the total transmissivity is 57.1% at the thickness of 2.3 μm. It is therefore understood that it is possible to see sufficiently through the molded article. As was shown in Table 4, this sample has a surface resistivity of $10^8$ Ω/□ and sufficient secondary formabilty.

TABLE 5

| Amount (in a solid, wt %) | Layer thickness μm | Transparency | |
|---|---|---|---|
| | | Total transmissivity (%) | Haze (%) |
| 4.5 | 0.50 | 79.7 | 3.2 |
| | 1.0 | 72.3 | 3.4 |
| | 2.3 | 57.1 | 7.9 |
| | 4.1 | 37.0 | 14.0 |
| Substrate | | 86.2 | 3.2 |

Note) Substrate, Transparent and hard PVC, 3 mm thickness

The foregoing shows that, according to the antistatic resin molded article of the present invention, the antistatic properties which are stable against any fabrication can be achieved only by formulating a small and appropriate amount of a graphite fiber and forming an extremely thin coating layer.

In the present invention, the antistatic resin layer applied on the surface of the resin substrate is the coating layer in which conductive long-fiber is flexuous and are dispersed in a thermoplastic resin so that these fibers are in contact with each another or hold electrically conductible intervals. The present invention can therefore produce an antistatic resin molded article for thermoforming which allows molding for secondary processing while maintaining the antistatic properties of the molded article.

An antistatic resin molded article using an extremely fine carbon long-fiber as the conductive long-fiber to form a coating layer can hold an antistatic function of the surface of the molded article even if the molded article is secondarily processed.

The use of the graphite fiber, which is extremely fine and has a large aspect ratio, as the conductive material contained in the antistatic resin layer allows pilled aggregates to be formed and the antistatic properties of the molded article can be thereby achieved in an efficient manner. Also, since the antistatic resin layer is apllyed with the coating layer which is produced of an coating fluid containing the graphite fiber, operation for imparting antistatic properties to the molded article is made simplified. Furthermore, sufficient antistatic properties can be exhibited only by adding a small amount of the graphite fiber and the use of a transparent substrate ensures preparation of a molded article with transparency.

The molded article with excellent transparency can be prepared particularly by adding a small amount of the extremely fine graphite fiber for the purpose of imparting antistatic properties to the antistatic resin layer. Further when a colorant is added to a transparent resin to make a substrate with a desired color in advance, a molded article can be obtained with ease which can be colored and has various deep color tones without damaging an intended color.

POSSIBILITY OF INDUSTRIAL APPLICATION

The antistatic resin molded article of the present invention is not reduced in antistatic property even if it is subjected to forming such as thermoforming, press, tension and bending as secondary processing in the fields of producing, molding, forming of synthetic resins, and usage of the synthetic resins. No application of an antistatic paint is therefore required after molding. This makes it possible to economically obtain molded articles with the shapes complicated which have not been provided with sufficient antistatic properties in the prior art, to say nothing of the simple shaped articles.

What is claimed is:

1. An antistatic resin molded article having thermal formability, comprising a thermoplastic resin substrate and an antistatic resin layer applied to the surface of the resin substrate, wherein the antistatic resin layer is formed of a coating layer containing 1 to 8% by weight of extremely-fine conductive carbon long-fibers dispersed in a thermoplastic resin, said coating layer has a thickness of 0.1 to 10 μm, and said extremely fine carbon long-fibers are fiber aggregates comprised of fibers having a fiber diameter of 3.5 to 500 nm and an aspect ratio of 100 to 3000.

2. An antistatic resin molded article according to claim 1, wherein said extremely fine carbon long-fibers are graphite fibers which have a circular section of graphite layers laminated coaxially to the fiber axis.

3. An antistatic resin molded article produced by thermoforming the antistatic resin molded article according to claim 1 at a forming magnification of 1.1 to 10.0 wherein the molded article has a surface resistivity of $10^{11}$ Ω/□ or less.

4. An antistatic resin molded article according to claim 1, wherein the fiber aggregates are further aggregated to form agglomerates.

* * * * *